Oct. 18, 1955
V. A. STEIN
2,720,782
INSTRUMENT FOR TESTING FUEL PUMPS
Filed May 10, 1951
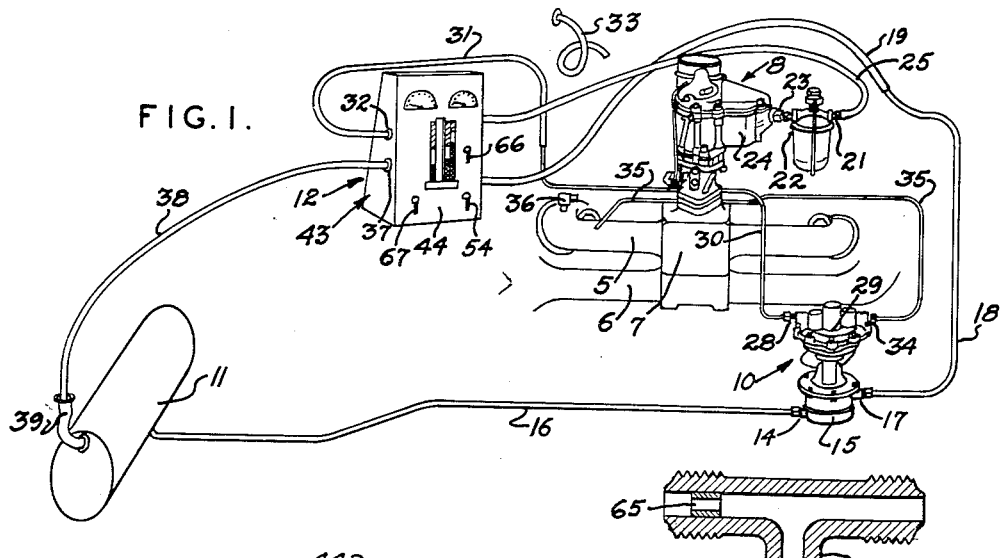
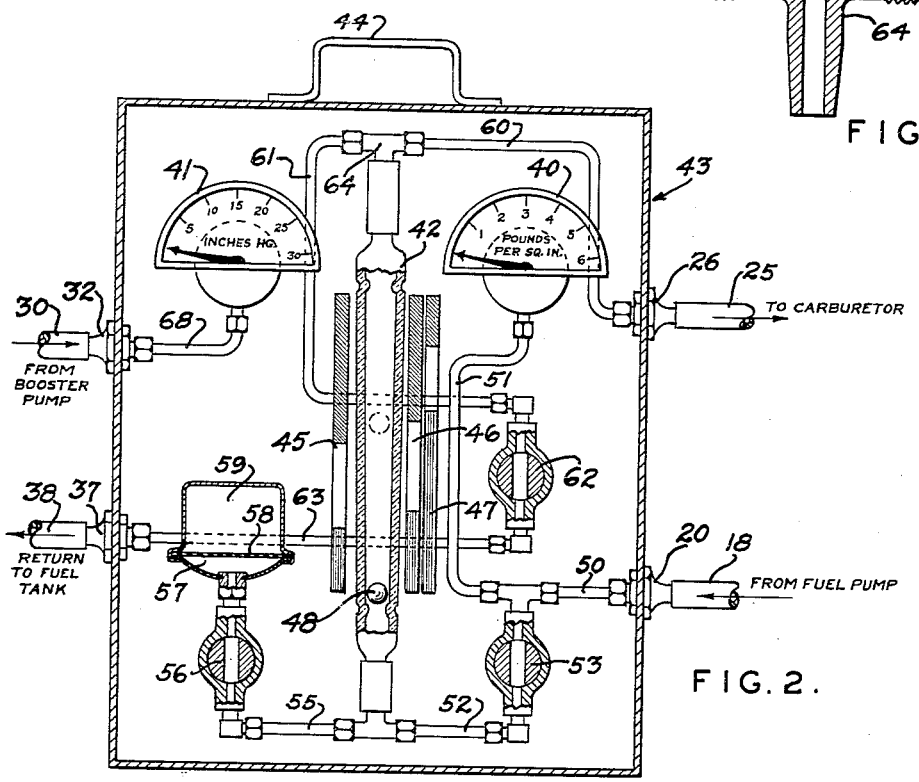
INVENTOR.
VINCENT A. STEIN
BY
George R. Ericson
ATTORNEY United States Patent Office 2,720,782
Patented Oct. 18, 1955

2,720,782

INSTRUMENT FOR TESTING FUEL PUMPS

Vincent A. Stein, Ferguson, Mo., assignor to Carter Carburetor Corporation, St. Louis, Mo., a corporation of Delaware Application May 10, 1951, Serial No. 225,621

7 Claims. (Cl. 73—118)

This invention relates to test instruments for internal combustion engine fuel pumps, particularly, those of the engine-operated, reciprocating, variable stroke type.

In the above type of fuel pump, as now in wide commercial use, the pumping diaphragm is operated in its charging direction by a one-way, mechanical connection to an engine operated cam shaft through a gear ratio of 1 to 2 whereby one stroke of the pump is produced for each two cycles of the engine crankshaft. The discharge action of the pump diaphragm is caused by a compression spring so that the pump output pressure, normally, is limited to the expansive energy in the spring.

This type of pump reaches its maximum rate of cyclical efficiency when the engine is operating at about 1500 R. P. M. which corresponds, approximately, to what is known as the fast idling speed of the engine. This produces pump reciprocation at the rate of 800 cycles per minute and it has been found that, for the same stroke of operation, the pump delivery does not increase materially as the cyclical rate thereof is increased above this mentioned rate.

One difficulty has been that it was frequently necessary to disassemble the pump from the engine during the test so that the test was not made under normal operating conditions.

Another difficulty in previous fuel pump testing devices has been that it was impossible to properly gauge the maximum flow pressure and volume normally produced by the pump at high engine speeds, principally, because it was not feasible to operate the engine at high speeds while standing on the garage floor.

A disadvantage of the reciprocating diaphragm type of fuel pump results from the pressure pulsations and the resultant reduced flow and lowered mean pressure. The most efficient commercial pump of this type embodies a resilient air dome on the discharge side of the pump which substantially dampens these pulsations with improvement in both the static pressure and flow of the pump.

The main object of the present invention is to provide a compact, complete instrument for testing automotive fuel pumps while operating normally on the engine.

Another object is to provide means for gauging the maximum capacity of the pump while operating normally on the engine, but without the necessity of operating the engine on the test floor at an excessive rate.

Another object is to provide a fuel pump test instrument with means for demonstrating the salutary effect of a resilient, pressure dome incorporated in the pump delivery system.

Another object is to provide a single, compact testing instrument with means for testing both the pump delivery and booster functions.

These objects and other more detailed objects hereafter appearing are attained by the device and structure illustrated in the accompanying drawing in which:

Fig. 1 is a diagrammatic representation showing a portion of an internal combustion engine manifolding system with a carburetor applied thereto and showing the fuel pump, the fuel tank and the novel test instrument connected thereto.

Fig. 2 is a front view and section showing the various features of the test instrument.

Fig. 3 is an enlarged section showing the T-fitting at the outlet end of the flow meter.

In Fig. 1 there is shown the intake manifold 5 and exhaust manifold 6 of an automotive engine forming at the center a "hot spot" portion 7 upon which is mounted a carburetor 8. The booster type fuel pump 10, remote fuel tank 11, and test instrument 12 are also shown with their operative connections. The inlet 14 of the fuel pump 15 is connected by a tube 16 to the fuel tank. Outlet 17 of the pump is connected by a tube 18 and hose 19 to a fitting 20 at one side of the test instrument. Tube 18, normally, connects to an inlet fitting 21 on a fuel filter device 22 which is connected to the fuel inlet fitting 23 of the carburetor. As is well known, this fitting leads into the constant level chamber 24 of the carburetor and the inlet connection is controlled by the usual float-operated needle valve (not shown).

Inlet 21 to the fuel filter, in the test set up, is connected by a hose 25 to a fitting 26 on the test instrument above fitting 20.

The inlet coupling 28 of the booster pump 29 is connected by a tube 30 and hose 31 to a fitting 32 on the test instrument opposite fitting 26. Tube 30, normally, connects by means of a hose, shown in part at 33, to a suction accessory, such as a windshield wiper motor, not shown. The outlet side 34 of the booster pump normally connects by means of a tube 35 to a coupling 36 in the wall of intake manifold 5. In making the test, however, this tube is disconnected from the manifold, as shown, to more accurately test the capacity of the booster.

A fourth fitting 37 on the test instrument below fitting 32 is connected by a return tube 38 to the fuel tank, entering, as shown, through the filler spout 39.

The booster type fuel pump, generally, is of the well known type now used with automotive engine, including a pair of pumping diaphragms which are operated in one direction by compression springs and in the other direction by one-way, mechanical connections to the engine camshaft. Such a fuel pump, but without the booster, is illustrated in Coffey Patent No. 2,424,965. The pump, as shown in this patent, has a resilient dome on the outlet side thereof which dampens the pump pulsations and, accordingly, improves the flow and pressure characteristics of the pump. Such outlet dome is not in use in other commercial fuel pumps of the reciprocating diaphragm type.

The test instrument, as more fully shown in Fig. 2, incorporates a pressure gauge 40, a vacuum gauge 41, and a glass tubetype flow meter 42, all mounted compactly within a casing 43 having a carrying handle 44. The indexed faces of these gauges are all visible, as shown in Fig. 1, through the front wall 44 of the casing. The flow meter is provided with indexed scales 45, 46, and 47 at the sides thereof. A ball 48 rests lightly within tube 42 so as to be impelled upwardly by fuel flowing through the tube a distance which is directly proportional to the volume of flow. Flow meter scales 45, 46, and 47 each has three divisions colored, starting from the bottom, red, white, and green, but in stepped relationship, as shown.

Fitting 20, which connects to the discharge side of the fuel pump is connected by means of tubing 50 and 51 to pressure gauge 40 and by tubing 52 to the bottom or inlet end of flow meter tube 42. A valve 53 in tube 52 has a handle 54 projecting through the front wall of the casing. A branch tube 55 from the inlet end of the flow meter connects through a valve 56 to a resilient dome device 57 which incorporates a diaphragm 58 and an air chamber 59. The upper or outlet end of the flow meter tube connects by means of tubing 60 to fitting 26 which leads to the carburetor. A branch 61 from the outlet end of the flow meter leads through a valve 62 and tube 63 to fitting 37 from which fuel is returned to the fuel tank.

Removably received within T-fitting 64 at the upper end of the flow meter is a removable, orifice restriction 65. Valves 62 and 56 are provided with operating handles 66 and 67. Orifice restriction 65 in the by-pass is carefully calibrated to return pumped fuel to the tank at a rate which is substantially equal to the difference between the rate of fuel flow necessary to operate the engine at the fast idle rate, that is, about 1500 R. P. M., and the maximum fuel requirements of the engine for high speed operation. The effect of this by-pass is to permit an accurate reading of the maximum flow capacity and pressure which may be produced by the pump while the engine is operating at a relatively slow speed on the test floor. This maximum reading is reasonably accurate because the reciprocating type of diaphragm pump, as now in general commercial use on automotive automobiles, reaches its maximum cyclical efficiency at about 800 cycles per minute, which corresponds to an engine speed of 1500 R. P. M. As the stroke rate of the pump increases (without increasing the length of stroke) the delivery remains substantially constant. However, the delivery may be increased, of course, by increasing the stroke of the pump. The effect of the by-pass is, accordingly, to permit operation of the pump at its full stroke and at its maximum cyclical efficiency, thus permitting a reading on the flow meter and the pressure meter under capacity operation of the pump. Since the rate of fuel delivery when the engine is operated at 1500 R. P. M., light load, that is "fast idle," is very small, restriction 65 may be made the same size as, or slightly smaller than the carburetor needle valve seat to provide a good approximation of the maximum fuel flow capacity of the pump. Obviously, the figure should, at least, equal the maximum requirement of the engine.

Fourth fitting 32 on the instrument casing is connected by tubing 68 to vacuum gauge 41 for testing the booster pump capacity.

Valve 53 may be closed to obtain a reading of the static pressure (no flow) produced by the pump. With valve 53 open, the flow volume may be read from the flow meter scales 45, 46, and 47. The red marked portions, central white or yellow marked portions, and upper green marked portions of these scales indicate, respectively, dangerously low, moderate, and fully satisfactory pump capacity. The different scales are read in accordance with the size of the engine being tested, scale 45 being for a small engine and scales 46 and 47 for larger engines.

Valve 56 may be opened to illustrate how dampening the pump pulsations will increase the volumetric fuel flow which will indicate that the air dome in the pump is not functioning or that the particular pump tested is not so equipped. Finally, the capacity of the booster pump may be read from the vacuum gauge 41.

Another important advantage of the test device is that, due to the maximum flow and the consequent high suction produced by the pump, any leak on the suction side of the system will be indicated by the presence of bubbles in the flow meter tube. If the pump where operated at low flow rate, the resultant low suction would not effectively indicate such leaks.

The instrument, therefore, provides for ready and accurate testing of the fuel pump while operating normally on an engine, without the necessity of operating the engine on the test floor at an excessive speed in order to gauge the capacity of the pump under actual operating conditions. Different kinds of gauges, of course, may be utilized and the invention may be modified in this and other respects as will occur to those skilled in the art without departing from the spirit of the invention. The exclusive use of all modifications as come within the scope of the appended claims is contemplated.

I claim:

1. In a test instrument for a fuel pump mounted on an engine having a carburetor and fuel tank, a casing having fittings for connection, respectively, to a fuel line from the pump and to a fuel delivery line leading to the carburetor, a flow meter connected between said fittings, a third fitting in said casing for connection to a return line leading to the fuel tank, a branch connection leading from the outlet side of said flow meter to said third fitting, and a restriction in said branch connection calibrated to pass fuel at a rate equivalent to the difference between the rate of fuel flow necessary to operate the engine at a predetermined slow speed under light load and the rate of fuel flow necessary to operate the engine at maximum speed.

2. In a test instrument for a fuel pump of the engine operated, pulsating, variable stroke type, a casing having a pair of fittings for connection, respectively, to the engine carburetor and fuel pump, a flow meter connected between said fittings, a third fitting in said casing having a branch connection to the outlet end of said flow meter, and an orifice restriction in said branch connection calibrated to pass fuel at the rate substantially equal to the difference in the rate of fuel normally delivered by the pump operating at substantially its highest cyclical rate, but minimum stroke, for running the engine at slow speed, light load, and the maximum rate of fuel delivery required by the engine.

3. A test instrument for internal combustion engine fuel pumps of the pulsating type, comprising a casing having a pair of fittings for connection, respectively, to the pump to be tested and the device for feeding fuel directly to the engine, a flow meter connected between said fittings, a resilient dome device, and a valved branch connection between said meter and said device for selectively subjecting the metered flow to the pulsation-dampening effect of said dome device to demonstrate the effect thereof upon said meter and the fuel pump discharge.

4. A test instrument as described in claim 3 including a pressure gauge connected between said fittings.

5. An instrument for testing an engine fuel pump of the reciprocating, variable-stroke type, while operating normally on the engine comprising a casing having a pair of fittings for connection, respectively, to the pump and the device for feeding fuel directly to the engine, flow and pressure gauges connected between said fittings, a resilient dome device, a valved branch connection between said flow gauge and said device for selectively indicating on said gauges the effect of pulsation dampening due to said dome device, a by-pass leading from the outlet end of said flow meter, a third fitting in said casing for connection to a source of fuel for said pump, and an orifice restriction in said by-pass for passing fuel at a rate substantially equal to the difference between the rate of fuel delivery with the pump operating at substantially its highest effective, cyclical rate and minimum stroke and the maximum requirement of the engine operating at high speed.

6. An instrument for testing a booster-type fuel pump device of the variable-stroke, reciprocating type while operating normally on an engine comprising a casing with a pair of fittings for connection, respectively, to the pump outlet and the device for feeding fuel directly to the engine, a flow meter connected between said fittings, a pressure gauge having a branch connection to the inlet side of said flow meter, a resilient dome device having a valved, branch connection to the inlet of said flow meter for demonstrating upon said meter and said gauge the effect of dampening pulsations in the fuel line from the pump, and a third fitting for connection to a source of fuel for said pump, a valved connection between the outlet end of said flow meter and said third fitting, there being an orifice restriction in said last mentioned connection calibrated to pass fuel at a rate substantially equal to the difference between the rate of fuel delivery by said device to the engine when operating at moderate speed, light load and the maximum requirement of the engine.

7. An instrument for testing an internal combustion engine dual pump and fuel system while operating on an engine comprising a casing, a pair of fittings for connection, respectively, to the test pump and the device for feeding fuel directly to the engine, a transparent tube connected between said fittings, a third fitting for connection to a source of fuel for said pump, a connection between said third fitting and the outlet end of said tube, and an orifice restriction in said last connection calibrated to return a portion of the pumped fuel to said source whereby, with the engine operating at a predetermined slow speed, the pump will operate at a substantially greater rate of flow and will apply substantially greater suction to its connection with said source than would be the case if the pump were supplying the engine alone, said transparent tube facilitating inspection of the pumped liquid for bubbles indicating leakage in the pump or engine fuel system.

References Cited in the file of this patent

UNITED STATES PATENTS

| | | |
|---|---|---|
| 2,062,173 | Haskins | Nov. 24, 1936 |
| 2,073,243 | Liddell et al. | Mar. 9, 1937 |
| 2,098,677 | Saballus et al. | Nov. 9, 1937 |
| 2,303,532 | Ewart et al. | Dec. 1, 1942 |